United States Patent Office 3,428,106
Patented Feb. 18, 1969

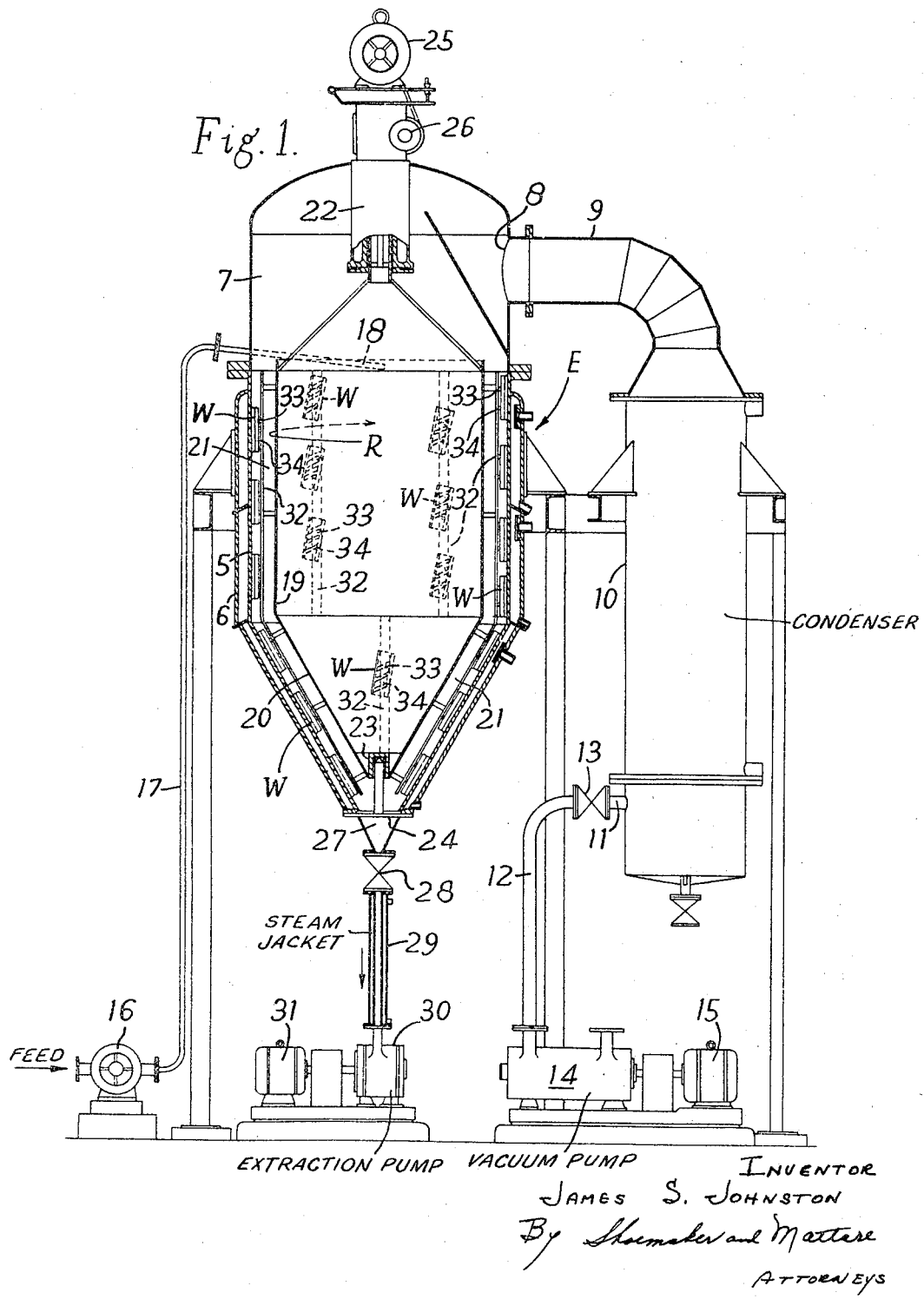

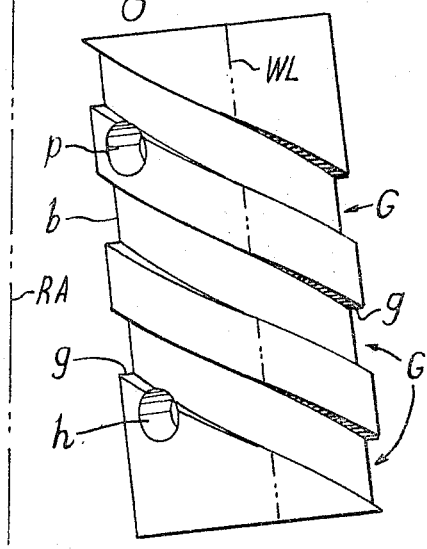
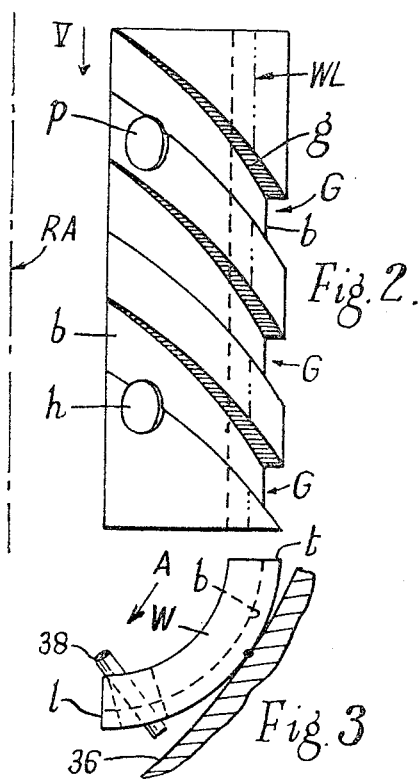
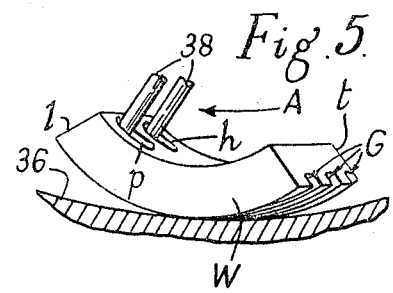

3,428,106
FILM MOLECULAR STILLS AND
EVAPORATORS
James S. Johnston, Kirkcaldy, Fife, Scotland, assignor to
Henry Balfour and Company Limited, Leven, Fife,
Scotland, a Scottish company
Filed Oct. 26, 1966, Ser. No. 589,621
Claims priority, application Great Britain, Oct. 27, 1965,
45,413/65
U.S. Cl. 159—6         12 Claims
Int. Cl. B01d 1/22

ABSTRACT OF THE DISCLOSURE

The evaporator includes an upright circular chamber having a rotor mounted therein carrying wiper elements. The wiper elements have curvilinear profile and make substantially tangential line contact with the wall of the chamber. The operative face of each of the elements is recessed with a plurality of spiral like grooves which extend across the face from the leading edge to the trailing edge and at an angle thereto.

---

This invention is a development of the invention (hereinafter called the basic invention) forming the subject matter of applicant's Patent No. 3,316,958 (hereinafter called the main patent).

The basic invention relates to stills and evaporators of the type (hereinafter called the type described) comprising a heated internal surface of revolution forming the still or evaporator wall and hereinafter referred to as such; means to feed the liquid to be distilled or evaporated onto said wall; a rotor coaxial with said wall; and a spreader device carried by the rotor so as to be rotatable therewith relative to said wall, said spreader device being adapted as the rotor rotates to spread out the liquid which has been fed onto the wall into the form of a thin film thereon, or two or more such spreader devices arranged at angularly spaced positions around the axis of said wall, the or each spreader device including a wiper extending lengthwise of said wall, said wiper being so mounted on the rotor as to possess freedom for movement relative thereto into and out of wiping contact with said wall, said movements into said contact being produced by centrifugal force operating on the wiper and arising from the rotational movement thereof around the rotor axis as the rotor rotates, or a series of such wipers operating on respectively different sections of the wall longitudinally thereof.

In the embodiments of the basic invention that are described and illustrated in the main patent the form of the or each wiper is such that the line of contact (hereinafter called the "wiping line") of the wiper is at an inclination to the rotor axis, its inclined disposition thereto giving the effect of increasing the progression rate of the product film, that is to say its rate of movement along the still or evaporator wall towards the product outlet of the apparatus under the pull of gravity.

According to the present invention a still or evaporator of the type described constructed in accordance with the basic invention is provided wherein the operative face of the or each wiper is recessed with a groove or grooves which extends or extend across the face from the leading edge of the wiper to the trailing edge thereof, the side walls of the or of each groove being inclined to the longitudinal axis of the wiper and their inclination or inclinations thereto being such that the two walls are in overlapping relation to one another transversely of the wiper.

A generally preferred construction is one in which the side walls of the or each groove are parallel to one another and wherein the grooves themselves are parallel to one another.

With wipers of such recessed form part of the curl of product which forms in the "nip" aforesaid between the portion of the curved operative face of the wiper located forwardly of the wiping line and the still or evaporator wall becomes gathered into and forced along the groove or each of the grooves in the operative face of the wiper to a position (1) in rear of the wiping line of the wiper and (2) displaced axially of the still or evaporator wall from the position at which it was gathered into the groove in front of the wiping line. In this way, irrespective of whether the wiper is disposed with its wiping line at an inclination to the rotor axis or parallel thereto, the effect is achieved of repeated redistribution of the product over the still or evaporator wall, plus the effect, already described with reference to the case where the wiping line of the wiper is inclined to the rotor axis, of progressively moving the product film along the still or evaporator wall towards the product outlet of the apparatus.

A still or evaporator constructed in accordance with the present invention may be similar in all respects, more particularly in respect of the curvature, general proportions and manner of mounting the wipers on the rotor, to the still or evaporator described and illustrated in the main patent. Thus:

(1) According to a generally preferred form of the invention, the construction may be one wherein the curvilinear profile of the or each wiper of the still or evaporator is arcuate, the angular extent of the arc being, for example, 90°; the or each wiper has a plurality of holes extending through it which accommodate carrier pegs for the wiper incorporated in the rotor of the still or evaporator; the said holes are circular; the said holes are spaced apart along a straight line which (a) is inset slightly from one of the two edges of the wiper which are respectively the leading edge and the trailing edge thereof, accordingly to whether the wiper is being trailed by the pegs or pushed thereby, (b) is disposed parallel to said one edge and (c), in the case where the wiping line of the wiper is inclined to the rotor axis, is at an angle to the rotor axis (in the elevational view of the rotor) so as to set the wiper at a corresponding angle thereto in said elevational view; and the diameter of the said holes is greater than the diameter of the pegs, the difference between the two diameters being such that, having regard to the length of the holes, the radius of the operative face of the wiper, the length of the pegs, the orientation of the pegs relative to the rotor axis in a plane perpendicular thereto and the radius of curvature of the still or evaporator wall, the wiper has complete freedom for floating movement on the pegs substantially in a plane perpendicular to the rotor axis between a non-wiping position in which its operative face is spaced from the still or evaporator wall and a wiping position in which its operative face is contacting said wall along a line which is located approximately midway between the leading and trailing edges of the wiper and which on account of the inclination of the line of contact of the wiper to the rotor axis (i.e. in a case where the wiping line of the wiper is inclined to the rotor axis) extends obliquely to the rotor axis, the direction of said inclination being such that the component of thrust of the wiper upon the product film on the still or evaporator wall due to said inclination is in the direction of the product outlet of the still or evaporator.

(2) The or each wiper may then have either of two typical shapes, hereinafter referred to, as in the main patent, as shape A and shape B. According to shape A, the thickness of the wiper (neglecting, the groove or grooves in the operative face of the wiper) is uniform from end to end and from leading edge to trailing edge of the wiper—the wiper then simulating a segment of a cylinder. According to shape B, the thickness of the wiper (neglecting, the groove or grooves in the operative face of the wiper) is substantially less than the length of the carrier peg holes (referred to above), the said holes extending through bosses projecting from the inner periphery of the wiper and affording the requisite length to the holes.

The accompanying drawings illustrate the present invention, by way of example.

In these drawings:

FIGURE 1 is a general arrangement view, in elevation, of a film distillation plant constructed in accordance with the present invention;

FIGURE 2 is an elevational view drawn on a larger scale than FIGURE 1 of one of the wipers of a still or evaporator in accordance with the present invention, illustrating a case where the wipers contact the still or evaporator wall along a line which is parallel to the rotor axis;

FIGURE 3 is an end view of the wiper shown in FIGURE 2, looking in the direction of the arrow V in that figure; and FIGURES 4 and 5 are views similar to FIGURES 2 and 3 illustrating a construction where as in the plant illustrated in FIGURE 1, the wipers contact the still wall along a line which is inclined to the axis of the still.

Referring first to FIGURE 1, the plant there shown includes a film evaporator, generally marked E, comprising a vertically disposed steam jacketed shell 5 having the form of a cylinder coaxially surmounting a cone frustum.

The steam jacket of shell 5 is marked 6 and surmounting the shell, coaxially therewith, is a vapour receiver 7 having a vapour outlet 8 communicating with a vapour draw-off pipe 9 leading to the inlet of a condenser 10 whose outlet 11 is connected by a pipe 12 controlled by a valve 13 to the inlet of a condensate/vacuum pump 14 driven by a motor 15.

Feed liquor is fed into evaporator E by a feed pump 16 communicating with a feed pipe 17 whose outlet 18 delivers the liquor onto an annular distributor device (not shown) located within the evaporator immediately adjacent the top of shell 5, said distributing device being operative to distribute the liquor evenly around the upper margin of the internal (heated) surface of the shell, from which upper margin the liquor then commences to flow down said surface by gravity, later to be assisted in its downward flow by the propulsion action of the wipers of the evaporator, thereby increasing its progression rate, as hereinbefore described.

Disposed coaxially within the structure formed by the shell 5 and the vapour receiver 7 is a rotor constituted by a rigid cylinder 19 surmounting and fast with a rigid cone-frustum shaped member 20, said rotor being spaced from shell 5 for the entire depth thereof by a relatively narrow annular space 21.

Evaporation of the liquor proceeds within the space 21, the vapours rising therein into vapour receiver 7 from which they become drawn off into condenser 10 for condensation therein in conventional manner, by the action of pump 14.

Rotor 19, 20 is rotationally hung upon an upper bearing carried in a mounting 22 incorporating means for sealing the interior space of vapour receiver 7.

Rotor 19, 20, which rotates in the direction of arrow R, is also supported at its lower end in a journal bearing 23 carried upon a supporting member 24 incorporated with the shell of the evaporator, and is driven by an overhead motor 25 through a worm reduction gear 26.

The lower end of space 21 communicates, by way of a product outlet 27, a valve 28 and a steam jacketed discharge pipe 29, with a product extraction pump 30 driven by a motor 31.

Situated within annular space 21, intermediately between shell 5 and rotor 19, 20 are a series of bars 32. These bars, which are arranged at equal angular intervals around the axis of the evaporator, are carried by the rotor 19, 20 in fast relation thereto and form in effect an integral part thereof.

Projecting outwardly from each of the bars 32, substantially radially of the evaporator, are a series of pairs of pegs 33, 34.

Carried upon each pair of pegs 33, 34 is a wiper W, the arrangement being such (see FIGURE 1) that the wipers on successive bars 32 around the axis of the rotor are in staggered relation to one another axially of the rotor so as to provide an arrangement in which the entire length of the shell 5 is swept by the wipers, considering them in the aggregate.

As in the plant particularly described and illustrated in the main patent, the number, the spacing (both axially and circumferentially of the evaporator) and the size (relatively to the size of the evaporator) of the wipers will depend upon the working requirements of the plant.

So far described, the plant is identical with the plant particularly described and illustrated in the main patent, with the exception that the wipers W are of the form, the operative face of the wiper is recessed with oblique grooves, FIGURES 4 and 5 illustrating the construction in this respect.

Each wiper has in its operative face a series of identical grooves G. The side walls $g$ of these grooves are, at any point along the groove, perpendicular to the longitudinal axis of the wiper and the bottom walls $b$ of the grooves are arcuate and concentric with the operative and rear faces of the wiper. The side walls of the grooves are parallel to one another and the grooves are equally spaced apart lengthwise of the wiper—as clearly shown. The grooves are of approximately spiral form, as appears from FIGURE 2, and their disposition is such that the upper side wall of each groove at the end thereof towards the trailing edge of the wiper is located nearer to the lower end of the wiper than is the lower side wall of the groove at the end thereof towards the leading edge of the wiper, with the result that said upper and lower side walls are in overlapping relation to one another transversely of the wiper. The wiper of these FIGURES 2 and 3 is formed with two carrier peg holes $p$, $h$ located on a line inset a short distance from the leading edge of the wiper and extending parallel thereto, the wiping line (WL) of the wiper being (a) parallel to the rotor axis (not shown, but parallel to line RA) and (b) situated intermediately between the leading and trailing edges $l$ and $t$ of the element.

In the construction illustrated in FIGURES 4 and 5, in which, as will be seen, the same reference numerals are used as those which are used in FIGURES 2 and 3, the wiper is identical to the wiper of these latter mentioned figures. It is so mounted, however, that its wiping line WL, which, as in the wiper of FIGURES 2 and 3, is situated intermediately between the leading and trailing edges $l$ and $t$ of the wiper, is at an inclination to the rotor axis (not shown, but parallel to line RA), as in the construction particularly described and illustrated in the main patent.

From the foregoing description of the illustrated embodiments of the present invention, the extreme simplicity of the latter, particularly of the said embodiments thereof, will be appreciated. Thus, according to said embodiments (and this applies also to the embodiments of the basic invention that are described and illustrated in the main patent), the wipers consist simply of a suitably curved and dimensioned plate mounted on carrier pegs of such form and disposition relative to the rotor and to the still or evaporator wall and having regard also to the location, shape and disposition of the holes through which they extend in the wiper plate, that the latter is possessed of complete freedom for limited floating (i.e. universal, as opposed to guided) movement in a plane substantially prependicular to the axis of the rotor. Such extreme simplicity is clearly an important and highly meritorious feature of the invention.

I claim:

1. An evaporator comprising an evaporator chamber circular in cross-section and having a heated wall, an inlet for material to be treated, an outlet for withdrawal of vapour and an outlet for withdrawal of the treated material, a rotor mounted in said chamber, wiper elements carried by said rotor and contacting said wall to spread said material thinly on said wall, said elements cooperating with said wall for advancing said material from said inlet to said material outlet, means mounting said wiper elements on said rotor for limited floating non-rotatable movement relative thereto in a plane perpendicular to the rotor axis, and said elements being of curvilinear profile in a plane perpendicular to the rotor axis and each of said wiper elements having a leading edge and a trailing edge and being rockable about its leading edge, and making substantially tangential line contact with said wall, intermediate the leading and trailing edges, each of said wiper elements having an operative face at which said contact with said wall is made, which operative face is recessed with a plurality of spiral like grooves which extend across said face from said leading edge to said trailing edge and have side walls which are inclined to the direction of length of the element at an angle thereto which is such that said side walls are in overlapping relation to one another transversely of the element.

2. An evaporator according to claim 1, wherein each wiper element constitutes substantially a 90 degree segment of a cylinder.

3. An evaporator according to claim 1, wherein the rotor carries groups of radially extending, axially arranged pegs, each group extending through holes in the leading edge of one of said wiper elements and adjustably carrying said wiper element.

4. An evaporator according to claim 3, wherein both the holes and the pegs are substantially cylindrical.

5. An evaporator according to claim 4, wherein the pegs of each group are coplanar and said plane extends at an angle to the rotor axis whereby said line of contact extends obliquely to the rotor axis.

6. An evaporator according to claim 5, wherein the diameter of the holes is greater than the diameter of the pegs and the difference between the two diameters is such that the wiper element has complete freedom for floating movement on the pegs substantially in a plane perpendicular to the rotor axis and is centrifugally urged toward the said wall and wherein the said line of contact with said wall is located approximately midway between the leading and trailing edges of said element and said inclination of said line being such that the component of thrust of the element upon the material is in the direction of said material outlet of an evaporator.

7. An evaporator according to claim 6, wherein the thickness of each wiper element is uniform and of wear-resistant composition.

8. An evaporator according to claim 6, wherein the wiper elements are in mutually staggered relation to one another, longitudinally of the rotor, so as to collectively wipe the entire surface of the evaporator wall.

9. An evaporator according to claim 8, wherein said rotor consists of a single tube of a diameter less than that of the evaporator wall and disposed coaxially with said wall, said carrier pegs for said wiper elements projecting from the outer surface of said tube.

10. An evaporator according to claim 6, wherein the upper portion of said evaporator is cylindrical and the lower portion is a material collecting and discharging cone.

11. An evaporator according to claim 10, wherein the rotor is provided with a downwardly extending conical extension spaced at its outer periphery a short distance from the inner surface of said discharge cone and carries at least one wiper for said surface.

12. An evaporator according to claim 11, wherein the axis of said evaporator chamber is substantially vertical and the wall thereof is surrounded by a heating element.

References Cited

UNITED STATES PATENTS

| | | | |
|---|---|---|---|
| 3,054,444 | 9/1962 | Robbins | 159—6 |
| 3,054,729 | 9/1962 | Smith | 159—6 |
| 3,180,398 | 4/1965 | Belcher et al. | 159—6 |
| 3,316,958 | 5/1967 | Johnston | 159—6 |

FOREIGN PATENTS 25,634 11/1897 Great Britain.

NORMAN YUDKOFF, *Primary Examiner.*

J. SOFER, *Assistant Examiner.*

U.S. Cl. X.R.

15—246.5; 202—236